(12) United States Patent
Gelbman

(10) Patent No.: US 6,184,650 B1
(45) Date of Patent: Feb. 6, 2001

(54) APPARATUS FOR CHARGING AND DESULFATING LEAD-ACID BATTERIES

(75) Inventor: Robert A. Gelbman, Boca Raton, FL (US)

(73) Assignee: Synergistic Technologies, Inc., Huntington, NY (US)

( * ) Notice: Under 35 U.S.C. 154(b), the term of this patent shall be extended for 0 days.

(21) Appl. No.: 09/444,668

(22) Filed: Nov. 22, 1999

(51) Int. Cl.⁷ .......................... H01M 10/44; H01M 10/46
(52) U.S. Cl. ............................................. 320/100; 320/131
(58) Field of Search .................................... 320/100, 129, 320/130, 131, 139, 141, 145, FOR 103

(56) References Cited

U.S. PATENT DOCUMENTS

| | | |
|---|---|---|
| 4,213,080 | 7/1980 | Rock . |
| 4,274,044 | 6/1981 | Barre . |
| 4,390,940 | 6/1983 | Corbefin et al. . |
| 4,626,983 | 12/1986 | Harada et al. . |
| 4,644,256 | 2/1987 | Farias et al. . |
| 4,695,935 | 9/1987 | Oen et al. . |
| 4,740,739 | 4/1988 | Quammen et al. . |
| 4,786,851 | 11/1988 | Fuji et al. . |
| 4,871,959 | 10/1989 | Gali . |
| 5,063,341 | 11/1991 | Gali . |
| 5,084,664 | 1/1992 | Gali . |
| 5,276,393 | 1/1994 | Gali . |
| 5,491,399 | 2/1996 | Gregory et al. . |
| 5,646,505 | 7/1997 | Melnikov et al. . |
| 5,648,714 | 7/1997 | Eryou et al. . |
| 5,677,612 | 10/1997 | Campagnuolo et al. . |

*Primary Examiner*—Edward H. Tso
(74) *Attorney, Agent, or Firm*—Donald A. Kettlestrings

(57) ABSTRACT

Apparatus for charging and desulfating lead-acid batteries provides a DC electrical charging current to the battery terminals to charge the battery to a fully charged voltage during a bulk charge mode. When the battery reaches a fully charged voltage, the apparatus switches to a float charge mode where the battery voltage decreases to a float voltage less than the fully charged voltage and is maintained at this level. When the apparatus is in the float charge mode, the battery charging current is turned rapidly on and off to maintain the battery at the float voltage and to desulfate the battery. When the battery voltage drops to a predetermined value below the float voltage, the bulk charge mode is reentered.

26 Claims, 3 Drawing Sheets

APPARATUS FOR CHARGING AND DESULFATING LEAD-ACID BATTERIES

BACKGROUND OF THE INVENTION

This invention relates to a battery charger and more particularly to apparatus for charging and desulfating a lead-acid type storage battery.

It is possible to reverse the build-up of sulfur crystals on the collectors (plates) of a lead-acid type storage battery. By "hitting" these plates with electrical pulses which produce energy at 3.26 MHz., which is the resonant frequency of a sulfur crystal, the bond is broken, allowing the molecules to dissolve back into the electrolyte solution from which they first came. The only known commercial use of this concept is in products that use a transformer oscillator circuit to generate the required pulse, typically 100 ma. with a 300 nsec. rise time. These devices are not capable of actually charging the battery in the required manner to ensure a fully charged battery, without ever overcharging said battery. Thus they do not require voltage limiting.

Unlike existing devices, this invention is a true two-stage battery charger, capable of fully charging the battery (13.8 V max.) as well as maintaining the battery at a fully charged level (13.2 volts) for indefinite periods, without ever overcharging it. This invention is capable of reversing the build-up of crystallized sulfur on the "plates" of a lead-acid storage battery, thereby improving the charge/discharge characteristics of a battery in which such formations have occurred. It accomplishes this process by rapidly turning the charger on and off (rise time=200–500 nsec.) and by generating pulses (1 Amp amplitude) during the "float" charge cycle.

Because no transformer is used to generate this waveform or to couple it to the battery, this invention is able to produce a pulse which has ten times the energy of a non-charger type device, such as those described in U.S. Pat. Nos. 4,871,959, 5,084,664, 5,276,393 and 5,491,399. The invention simultaneously controls the voltage to 13.2 volts maximum, which ensures that the battery is never over-charged. Non-charging type devices, such as described in the aforementioned patents, do not need voltage limiting, as the pulses they generate are typically only 1/10 (100 ma.) in amplitude of even a low output (1 Amp) charger.

There are other patented techniques to reduce sulfation of lead-acid battery plates which employ pulse techniques. A fast rise time pulse is developed and pulses the battery. See U.S. Pat. Nos. 4,871,959, 5,084,664, 5,276,393 and 5,491,399. All of the techniques rely on a fast pulse developed by a transformer oscillator circuit and specifically include all types of transformer oscillators. These units are not battery chargers. They develop a pulse of about 100 ma. with a 300 nsec. rise time, which has energy at 3.26 MHz. which is the resonant frequency of sulfur crystals. See FIG. 1. When the crystals are subjected to this energy the crystal structure is changed and the molecules dissolve back into the solution and create an active electrolyte.

This invention is different in that it is a battery charger. The charger is connected to a battery and begins the charge cycle. The battery reaches 13.8 volts and then enters a float mode of operation. This mode will prevent the battery voltage from going below 13 volts. In a heavily sulfated battery the voltage will drop below 13 volts and the charger will turn on to try to charge the battery. The charger of this invention is rapidly turned on and off. The charger turn on rise time is about 300 nsec. but the current is 1000 ma., which is ten times higher than the pulse units of the prior art. See FIG. 2. No transformer is used by this invention to generate this waveform or to couple it into the battery. Therefore, this invention generates ten times as much energy with a controlled 13 volt maximum. As the sulfation decreases, less energy is required, and the current decreases to zero at 13 volts. This means that the voltage cannot rise above 13 volts and the electrolyte will not boil away. The prior art pulse units cannot charge the battery so they do not need voltage limiting.

A schematic illustration for the invention is shown in FIGS. 3A and 3B and a parts list table is set forth infra.

An object of the present invention is to provide apparatus for charging and desulfating lead-acid type storage batteries.

Another object is to provide such apparatus which eliminates the requirement for use of transformer oscillator circuits for generating desulfation pulses.

A further object of the invention is the provision of such apparatus which eliminates the need for microprocessors for controlling pulse amplitudes to the battery as the battery is desulfated.

Still another object is to provide such apparatus which rapidly turns the battery charging current on and off to produce desulfation.

Yet another object of the present invention is the provision of such apparatus wherein the rise time of the pulsed charging current is sufficient for effectively desulfating the battery.

Another object is to provide such apparatus which effectively desulfates lead-acid type storage batteries by providing high energy pulses to the battery to both charge and desulfate the battery.

A further object is to provide such apparatus wherein the battery voltage cannot rise above a predetermined level so that battery electrolyte will not boil away.

Another object of the invention is the provision of such apparatus which maintains the battery at a predetermined voltage.

Still another object is to provide such apparatus which does not add an auxiliary pulse on top of a DC charge current to desulfate the battery.

Yet another object of the present invention is the provision of such apparatus which does not require the use of high power pulse generators and complex electronic control circuits to generate high amplitude pulses.

A still further object is to provide such apparatus which is reliable and less expensive than previously known desulfation systems which generate high amplitude pulses on top of a DC charging current.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides apparatus for charging and desulfating a battery, the apparatus comprising: means for electrically connecting the apparatus to the battery; first electrical circuit means for connecting with a source of AC electrical power to provide DC current; second electrical circuit means connected in electrical circuit relationship with the first circuit means and with the connecting means for providing DC charging current to charge the battery to a first predetermined voltage; and third electrical circuit means connected in electrical circuit relationship with the first and second circuit means and with the connecting means for automatically pulsing the charging current on and off to maintain the battery at a second predetermined voltage less than the first predetermined voltage and to desulfate the battery.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

DESCRIPTION OF THE PREFERRED EMBODIMENT

Figure 1:
FIG. 1 illustrates pulsed desulfation wave forms used by prior art desulfation circuits.
Figure 2:
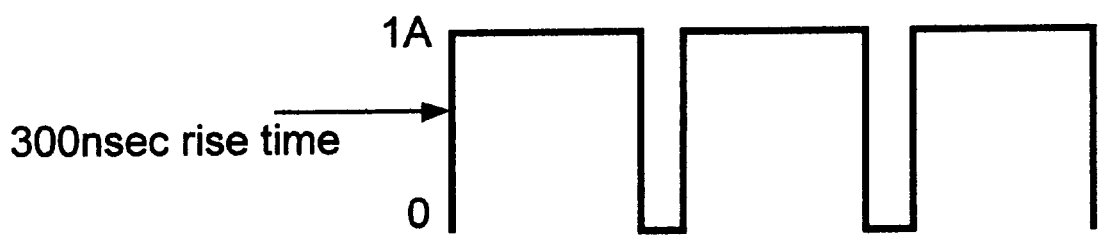
FIG. 2 illustrates the pulsed charging current and desulfation wave form of the present invention.
Figure 3A:
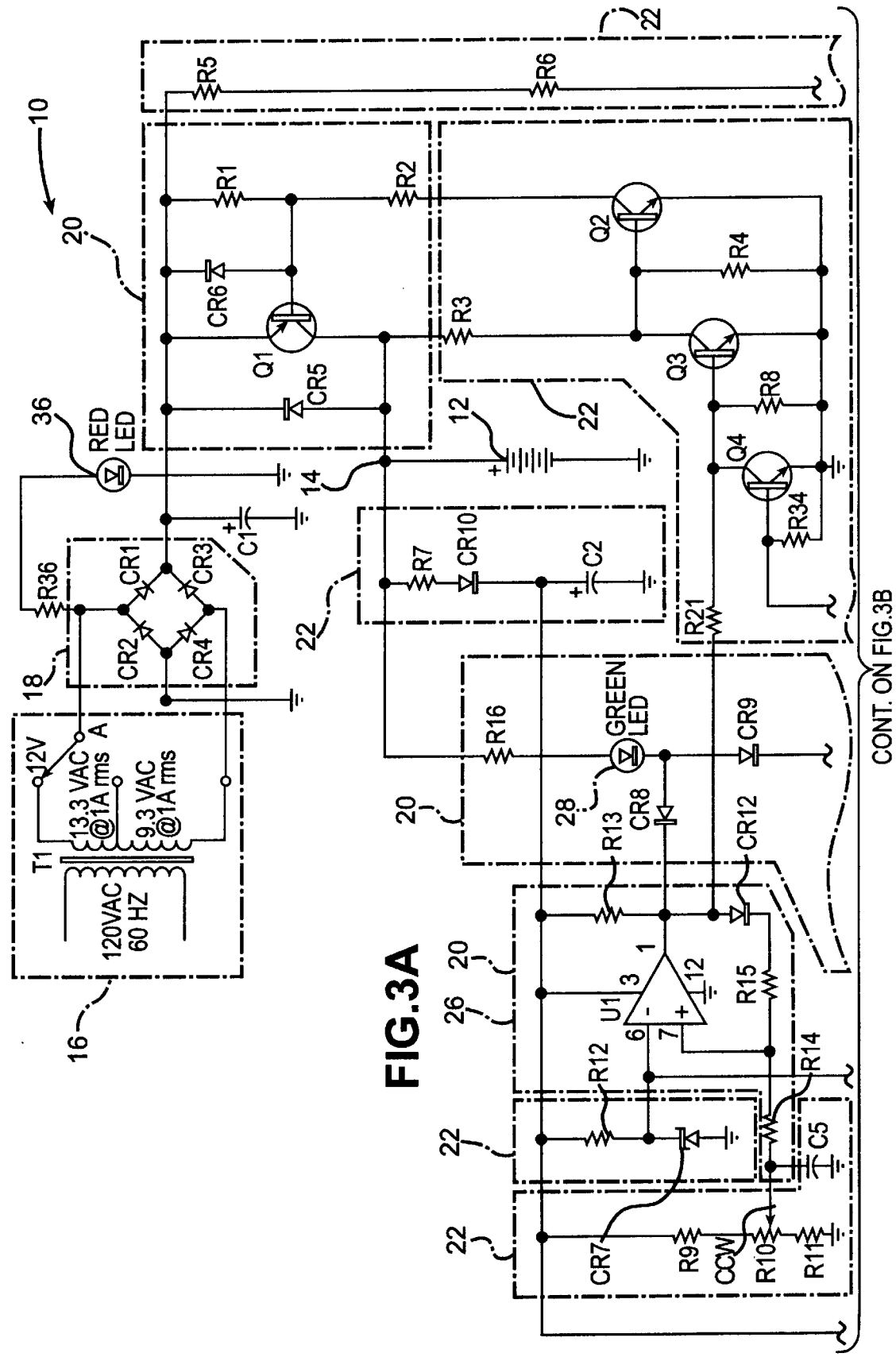
FIGS. 3A and 3B are schematic drawings illustrating the circuitry of this invention.
Figure 3B:
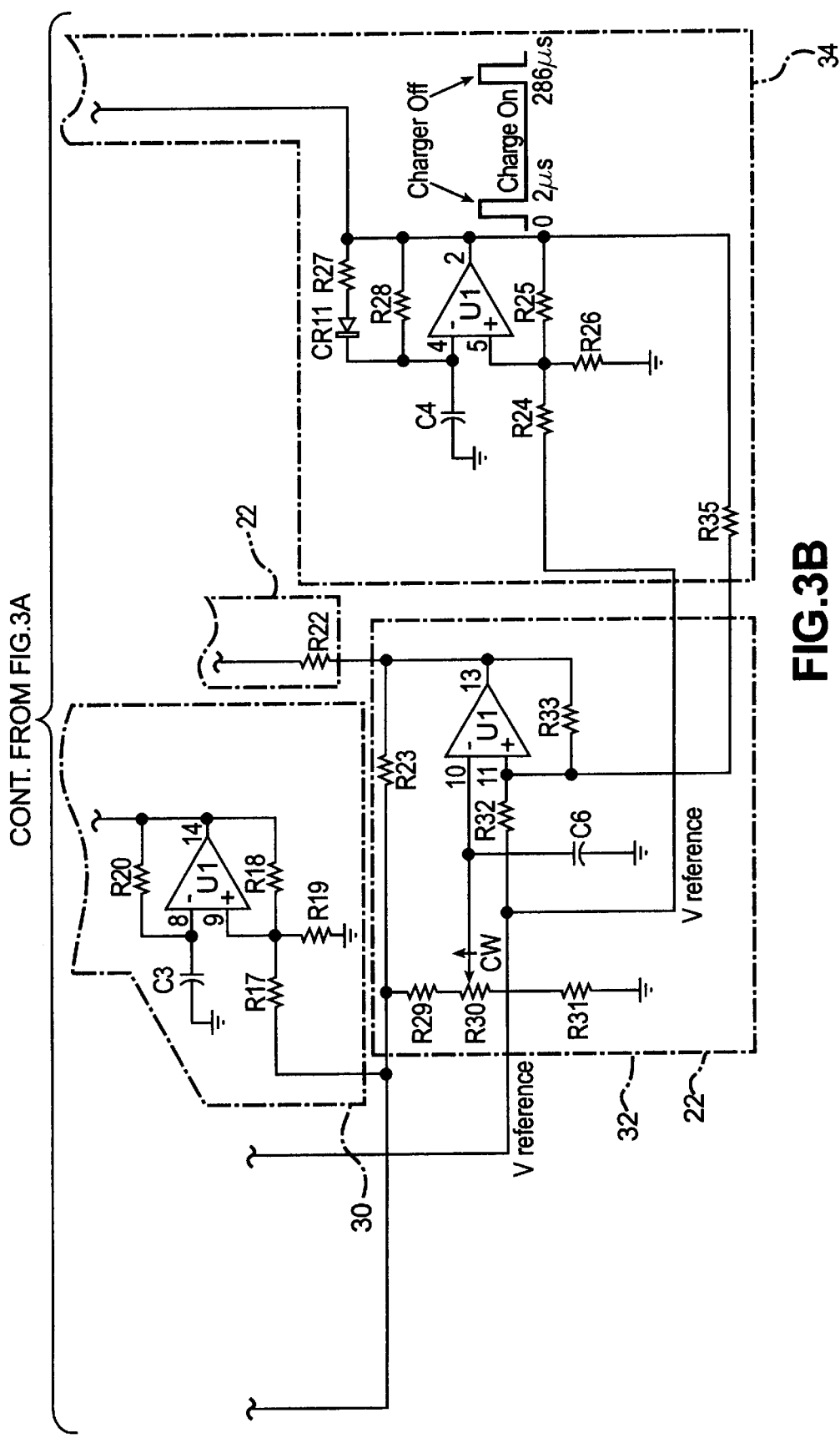

With reference now to the drawings, wherein like reference characters designate like or corresponding parts throughout the several views, there is shown in FIGS. 3A and 3B apparatus 10 for charging and desulfating a lead-acid type storage battery 12. Apparatus 10 includes means 14, such as a connecting terminal, for electrically connecting apparatus 10 to battery 12 in a conventional manner.

Apparatus 10 further includes first electrical circuit means 16, 18 for connecting with a conventional source of AC electrical power (not shown) to provide DC current.

Apparatus 10 further includes second electrical circuit means 20 connected in operative electrical circuit relationship with first circuit means 16, 18 and with connecting means 14 for providing DC charging current to charge battery 12 to a first predetermined voltage.

Apparatus 10 also includes third electrical circuit means 22 connected in operative electrical circuit relationship with circuit means 16, 18, 20 and with connecting means 14 for automatically pulsing the charging current on and off to maintain battery 12 at a second predetermined voltage less than the first predetermined voltage and to desulfate battery 12.

In accordance with the invention, second electrical circuit means 20 includes an electrical switch Q1 in electrical circuit relationship with connecting means 14 for providing DC charging current to battery 12 when the battery is connected to connecting means 14 and when switch Q1 is switched on.

Second electrical circuit means 20 further includes means 26 in electrical circuit relationship with switch Q1 for switching off switch Q1 when battery 12 reaches a first predetermined voltage.

Second electrical circuit means 20 preferably further includes a first indicator light 28 and an oscillator 30 in electrical circuit relationship with switching-off means 26 and with indicator light 28 for lighting indicator light 28 when battery 12 reaches a first predetermined voltage.

In accordance with the invention, third electrical circuit means 22 includes means 32 in electrical circuit relationship with switch Q1 for switching on switch Q1 when the voltage of battery 12 drops below a second predetermined voltage to try to maintain the second predetermined voltage, or float voltage, on the battery.

Third electrical circuit means 22 further includes means 34 in circuit relationship with switch Q1 for pulsing switch Q1 on and off to automatically pulse the battery charging current on and off.

In normal operation, Q1 is fully on and connects the charged input capacitor C1 to battery 12 allowing the battery to charge. In the antisulfation mode of operation, an oscillator (pulse generator) 34 formed by one of the comparators of U1 generates the waveform required to turn Q1 off for a few microseconds. The oscillator (pulse generator) 34 operation is as follows: C4 is charged through R27 and diode CR11 and discharged through R28. This produces a non-symmetrical waveform, which is connected to pin 11 of U1. The actual switching voltages are determined by R24, R25 and R26. The waveform at pin 11 causes pin 13 of U1 to drive transistor Q4 and therefore Q1 through transistors Q3 and Q4. It is this rapid turn on and turn off of Q1 which causes the antisulfation operation.

This invention provides a charger which is momentarily turned off and then back on. The non-symmetrical operation is required so that the charger is on for the longest time to keep the high current rating of the charger intact. (A 1 Ampere charger operating at 50% duty cycle has only a 0.5 Ampere output charging current while a 98% duty cycle yields 0.98 Ampere output.)

This invention operates as an AC to DC converter operating from 120 VAC input power and generates 12 VDC at 1 ampere to charge a lead-acid battery. The charger of this invention has two modes of operation and an additional mode to cause battery desulfation.

The main mode of operation is the bulk charge mode where the battery charger supplies up to 1 ampere of charge current to a twelve volt battery 12, taking battery 12 up to 13.8 volts and then switching to the float charge mode where the battery voltage decreases to 13.2 volts and is maintained at this level by the charger. In addition, when the charger is in the float mode, the antisulfation circuit portion of this invention provides a fast rise turn on of the charger as the charger is turned on and off at a rate of about 20,000 times a second. It is this turn on and turn off that produces the energy at 3.26 MHz. that allows the sulfur crystals to break up and return to the sulfuric acid electrolyte in the battery. When this happens the sulfation coating on the lead plates within the battery is reduced causing the battery source impedance to decrease and the discharge Ampere-Hour capacity to increase.

Transformer T1 converts 120 VAC 60 Hz. power to 13.3 VAC. The transformer is rated at 13.3 VAC @ 1 Ampere. The AC voltage is rectified by diodes CR1, CR2, CR3 and CR4, which form a full-wave bridge. Capacitor C1 peak stores this voltage and produces about 17.6 volts DC to charge the battery. Transistor Q1 is a power transistor which is switched on by transistor Q2 only when Q2 has a positive base drive current. Q2 gets positive base drive only when the battery is connected with the correct polarity. This circuitry provides reverse polarity protection for the charger since Q1 will not turn on for a reversed battery.

Once Q1 is properly turned on, the battery voltage is sensed by the resistor voltage divider R9, R10 and R11. The CR7 zener diode reference is the voltage against which the battery voltage is compared, and when the battery reaches 13.8 volt comparator U1 pin 1 switches to a high voltage state. While U1 is in the low voltage state first Green LED 28 is continually lit. When U1 pin 1 is switched high, comparator pin 14, which is switching high and low at a 1 Hz. rate, now controls Green LED 28 and causes it to flash at a 1 Hz. rate indicating the float charge mode of operation. Diodes CR8 and CR9 isolate the comparator output pins 1 and 14. Once pin 1 is high it is kept high by positive feedback to input pin 7 through resistor R15 and diode CR12 until the battery voltage drops to 12 volts when the bulk charge mode is reentered. Capacitor C5 provides filtering of the battery ripple voltage at pin 7 of the comparator.

The float charge mode flasher 28 simply uses the comparator as an oscillator by causing capacitor C3 to charge through resistor R20. When the voltage at pin 8 equals the voltage at pin 9, the output pin 14 switches low. The voltage at pin 9 is generated by the voltage divider R17, R18 and R19. This voltage is different depending on the level of pin 14 and allows the comparator to oscillate. When pin 1 is high, transistor Q3 is turned on through resistor R21 which causes Q2 to turn off and turns the charge current off by turning Q1 off. Comparator pin 13 is controlled by the battery voltage and the CR7 reference voltage and allows this comparator to control transistor Q4 through resistor R22. Capacitor C6 filters the battery ripple voltage from voltage divider R29, R30 and R31.

When the voltage on pin 10 is less than the reference voltage on pin 11, the output pin 13 switches high turning transistor Q4 on. When transistor Q4 turns on, transistor Q3 turns off, transistor Q2 turns on and power transistor Q1 turns on and supplies charging current to the battery. At this time, a short pulse at pin 2 of the comparator is generated. This pulse is caused by the charging of capacitor C4 through resistor R27 and diode CR11. The off time is generated by the discharge of C4 through R28. The other voltages at the voltage divider formed by R24, R25 and R26 allow for the oscillation of this comparator and produce a continuous pulsing waveform.

This waveform is fed into pin 11 of float charge control comparator 32. This causes Q4 to switch on and off and, in turn, causes Q1 to switch on and off, supplying the fast rise time current to recombine the sulfation on the battery plates. This process of turning the charger on and off is responsible for creating the antisulfation and is responsible for supplying large amplitude currents on the order of 500 to 800 ma. for each pulse. These pulse amplitudes are much larger than the pulse currents generated by high voltage pulse generator techniques of desulfation circuits which generate 40 to 100 ma. pulses and do not actually charge the battery.

This charger turn-on, turn-off desulfation technique is applicable to any charger, constant voltage or constant current, at any current level. Switchmode chargers are particularly adaptable since the charging is done on a pulse by pulse basis. With no DC filtering, that is no output filter to maintain a DC current level, each output pulse causes a fast rise current increase which would desulfate the battery while it charges it. Therefore, charger turn-on/turn-off is the important technique of this invention. Resistor R36 and Red LED 36 indicate that the AC voltage to the charger is present. Resistor R7 and CR 10 supply power to the charger control circuitry and capacitor C2 filters this voltage.

The present invention, as described and illustrated, has a 1 ampere rating and will pulse the battery with 1 ampere pulses. A larger unit, in accordance with the invention, may produce, for example, 5 ampere pulses. This will desulfate a battery faster since the pulse amplitudes are so large.

An important concept of this invention is the turning on and turning off of the charger to produce the desulfation. The off time is adjusted to be small compared to the on time so that the unit of this invention is mostly on. The fast turn on desulfates the battery.

The invention in its broader aspects is not limited to the specific details shown and described, and departures may be made from such details without departing from the principles of the invention and without sacrificing its chief advantages.

| Parts List Table | | |
| --- | --- | --- |
| CR1-4 | Rect, Diode | 1N4004 |
| CR5,6 | Rect, Diode | 1N4148 |
| CR7 | Zener 5.1 V | 1N5993B |
| CR7(6 V) | Zener 4.7 V | |
| CR8-12 | Rect, Diode | 1N4148 |
| U1 | IC | LM339N |
| Q1 | NPN, Trans | BD434 |
| Q2 | NPN, Trans | MPSA06 |
| Q3 | NPN, Trans | 2N3904 |
| Q4 | NPN, Trans | 2N3904 |
| R1, R36 | Resistor | 1K |
| R2 | Resistor,1 W | 330Ω |
| R3(12 V) | Resistor | 15K |
| R3(6 V) | Resistor | 5.6K |
| R4 | Resistor | 1.2K |
| R5, 12 | Resistor | 1K |
| R6 | Resistor | 4.7K |
| R7 | Resistor | 27Ω |
| R8 | Resistor | 20K |
| R9(12 V) | Resistor | 18K |
| R9(6 V) | Resistor | 2.4 KΩ |
| R10, 30 | Resistor, Var | 5K |
| R11 | Resistor | 10K |
| R13 | Resistor | 4.7K |
| R14 | Resistor | 10K |
| R15 | Resistor | 100K |
| R16 | Resistor | 1K |
| R17–19 | Resistor | 100K |
| R20 | Resistor | 220K |
| R21, 22 | Resistor | 47K |
| R23 | Resistor | 4.7K |
| R24–26 | Resistor | 100K |
| R27 | Resistor | 1K |
| R28 | Resistor | 39K |
| R29(12 V) | Resistor | 15K |
| R29(6 V) | Resistor | 100Ω |
| R31 | Resistor | 10K |
| R32 | Resistor | 10K |
| R33 | Resistor | 1MΩ |
| R34 | Resistor | 20 KΩ |
| R35 | Resistor | 510 KΩ |
| C1 | Capacitor | 470 μfd, 25 V |
| C2 | Capacitor | 470 μfd, 15 V |
| C3 | Capacitor | 1.0 μfd, 15 V |
| C4 | Capacitor | 0.00 μfd, 15 V |
| C5, C6 | Capacitor | 47 μfd, 15 V |
| LED1 | Green LED | |
| T1 | Xfmr | AMC88-2379502FM |

What is claimed is:

1. Apparatus for charging and desulfating a battery, said apparatus comprising:

means for electrically connecting said apparatus to said battery;

first electrical circuit means for connecting with a source of AC electrical power to provide DC current;

second electrical circuit means connected in electrical circuit relationship with said first circuit means and with said connecting means for providing DC charging current to charge said battery to a first predetermined voltage; and third electrical circuit means connected in electrical circuit relationship with said first and second circuit means and with said connecting means for automatically pulsing said charging current on and off to maintain said battery at a second predetermined voltage less than said first predetermined voltage and to desulfate said battery.

2. Apparatus as in claim 1 wherein the rise time of said pulsed charging current is substantially from 200–500 nanoseconds for effectively desulfating the battery.

3. Apparatus as in claim 1 wherein said pulsed charging current is a nonsymmetrical waveform whereby said current is on longer than said current is off.

4. Apparatus as in claim 3 wherein said nonsymmetrical waveform provides for said charging current to be off for substantially 1–2 microseconds during each pulse cycle.

5. Apparatus as in claim 3 wherein said pulsed charging current is pulsed at substantially 20,000 times per second.

6. Apparatus as in claim 3 wherein said pulsed charging current provides substantially at least 1 amp pulses to said battery.

7. Apparatus as in claim 1 wherein said second electrical circuit means includes an electrical switch in electrical circuit relationship with said connecting means for providing said DC charging current to said battery when said battery is connected to said connecting means and when said switch is switched on.

8. Apparatus as in claim 7 wherein said second electrical circuit means further includes means in electrical circuit relationship with said switch for switching off said switch when said battery reaches said first predetermined voltage.

9. Apparatus as in claim 8 wherein said second electrical circuit means further includes a first indicator light and an oscillator in electrical circuit relationship with said switching-off means and with said first indicator light for flashing said first indicator light when said battery reaches said first predetermined voltage.

10. Apparatus as in claim 8 wherein said third electrical circuit means includes means in electrical circuit relationship with said electrical switch for switching on said switch when said battery voltage drops below substantially said second predetermined voltage.

11. Apparatus as in claim 10 wherein said third electrical circuit means further includes means in circuit relationship with said switch for pulsing said switch on and off to automatically pulse said charging current on and off.

12. Apparatus as in claim 11 wherein the rise time of said pulsed charging current is substantially from 200–500 nanoseconds for effectively desulfating the battery.

13. Apparatus as in claim 12 wherein said pulsed charging current is a nonsymmetrical waveform whereby said current is on longer than said current is off.

14. Apparatus as in claim 13 wherein said nonsymmetrical waveform provides for said charging current to be off for substantially 1–2 microseconds during each pulse cycle.

15. Apparatus as in claim 13 wherein said pulsed charging current is pulsed at substantially 20,000 times per second.

16. Apparatus as in claim 13 wherein said pulsed charging current provides substantially at least 1 amp pulses to said battery.

17. Apparatus as in claim 1 wherein said third electrical circuit means include fourth means in operative relationship with said second electrical circuit means for automatically ceasing said pulsing of said charging current and for reinstating said DC charging current to said battery when said battery voltage drops to a third predetermined voltage less than said second predetermined voltage.

18. Apparatus as in claim 17 wherein said third electrical circuit means further include a first indicator light which is continually lighted when said DC charging current is applied to said battery.

19. A method for charging and desulfating a battery having positive and negative terminals, said method comprising the steps of:

providing DC electrical charging current to said battery terminals to charge said battery to a first predetermined voltage; and pulsing said charging current on and off to said battery terminals to maintain said battery at a second predetermined voltage less than said first predetermined voltage and to desulfate said battery.

20. A method as in claim 19 wherein the rise time of said pulsed charging current is substantially from 200–500 nanoseconds for effectively desulfating the battery.

21. A method as in claim 19 wherein said pulsed charging current is a nonsymmetrical waveform whereby said current is on longer than said current is off.

22. A method as in claim 21 wherein said nonsymmetrical waveform provides for said charging current to be off for substantially 1–2 microseconds during each pulse cycle.

23. A method as in claim 21 wherein said pulsed charging current is pulsed at substantially 20,000 times per second.

24. A method as in claim 21 wherein said pulsed charging current provides substantially at least 1 amp pulses to said battery.

25. A method as in claim 19 further including the step of ceasing said pulsing of said charging current and reinstating said DC charging current to said battery when said battery voltage drops to a third predetermined voltage less than said second predetermined voltage.

26. A method as in claim 25 further including the step of continually lighting a first indicator light when said DC charging current is applied to said battery.

* * * * *